(12) United States Patent
Yoo et al.

(10) Patent No.: US 12,508,709 B2
(45) Date of Patent: Dec. 30, 2025

(54) SAFETY DETECTING DEVICE AND A SAFETY DETECTING SYSTEM INCLUDING THE SAME

(71) Applicants: HYUNDAI MOTOR COMPANY, Seoul (KR); KIA CORPORATION, Seoul (KR)

(72) Inventors: Hwa Woong Yoo, Suwon-si (KR); Ki Hoon Nam, Gwangmyeong-si (KR); Ji Su Kim, Seoul (KR); Byung Ho Yoon, Seoul (KR); Yong Chul Shin, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 121 days.

(21) Appl. No.: 18/520,033

(22) Filed: Nov. 27, 2023

(65) Prior Publication Data
US 2024/0408755 A1    Dec. 12, 2024

(30) Foreign Application Priority Data
Jun. 12, 2023  (KR) ........................ 10-2023-0074978

(51) Int. Cl.
*G06F 17/00*  (2019.01)
*B25J 9/16*   (2006.01)

(52) U.S. Cl.
CPC .......... *B25J 9/1666* (2013.01); *B25J 9/1694* (2013.01); *B25J 9/1697* (2013.01)

(58) Field of Classification Search
CPC ...... B25J 9/1666; B25J 9/1694; B25J 9/1697; B25J 19/06; B25J 9/1674; B25J 5/00;
(Continued)

(56) References Cited

U.S. PATENT DOCUMENTS

| 7,391,178 B2 | 6/2008 | Tanaka et al. |
| 8,032,253 B2 | 10/2011 | Nagata et al. |

(Continued)

FOREIGN PATENT DOCUMENTS

| CN | 101147104 A |   | 3/2008 |           |
| CN | 102448681 B | * | 9/2014 | B25J 9/1676 |

(Continued)

OTHER PUBLICATIONS

AR-based interaction for human-robot collaborative manufacturing (Year: 2019).*

*Primary Examiner* — Ronnie M Mancho
(74) *Attorney, Agent, or Firm* — Lempia Summerfield Katz LLC

(57) ABSTRACT

A safety detecting device includes a detector that detects an external object located in a detection area, and a controller that determines the detection area based on whether a communication with a robot that is moved in a specific movement area is made. The controller is configured to determine the detection area as a preset initial detection area in a non-communication state, in which no communication with the robot is made, and further determine the detection area based on any one of posture information of the robot, operation information of the robot, or a combination thereof, in a communication state, in which a communication with the robot is made.

14 Claims, 11 Drawing Sheets

(58) Field of Classification Search
CPC ........ B25J 13/006; B25J 13/089; B25J 19/02;
B60L 53/35
USPC ......................................................... 700/259
See application file for complete search history.

(56) References Cited

U.S. PATENT DOCUMENTS

| | | | |
|---|---|---|---|
| 11,697,209 B1* | 7/2023 | Mourlam | B66F 11/046 |
| | | | 700/255 |
| 2006/0108960 A1 | 5/2006 | Tanaka et al. | |
| 2009/0030550 A1 | 1/2009 | Nagata et al. | |
| 2017/0182662 A1 | 6/2017 | Huang et al. | |
| 2018/0361578 A1* | 12/2018 | Muneto | B25J 9/1605 |
| 2020/0368909 A1* | 11/2020 | Sejimo | B25J 9/1669 |
| 2022/0130147 A1 | 4/2022 | Courteville | G06V 20/52 |
| 2023/0017738 A1* | 1/2023 | Elliott-Bowman | |
| | | | A61B 1/00039 |
| 2024/0033928 A1* | 2/2024 | Mourlam | B25J 9/0087 |
| 2024/0377841 A1* | 11/2024 | Park | H04B 3/54 |
| 2024/0408755 A1* | 12/2024 | Yoo | B25J 9/1666 |

FOREIGN PATENT DOCUMENTS

| | | | | |
|---|---|---|---|---|
| EP | 1535706 A1 | 6/2005 | | |
| JP | H11165291 A | 6/1999 | | |
| JP | 2007283450 A | 11/2007 | | |
| JP | 2011125975 A | 6/2011 | | |
| JP | 4995458 B2 * | 8/2012 | ........... | G05D 1/0242 |
| KR | 20230079680 A * | 8/2012 | | |
| KR | 20240175176 A * | 8/2012 | | |
| KR | 101576634 B1 | 12/2015 | | |

* cited by examiner

SAFETY DETECTING DEVICE AND A SAFETY DETECTING SYSTEM INCLUDING THE SAME

CROSS-REFERENCE TO RELATED APPLICATION

This application claims the benefit of and priority to Korean Patent Application No. 10-2023-0074978, filed in the Korean Intellectual Property Office on Jun. 12, 2023, the entire contents of which are incorporated herein by reference.

TECHNICAL FIELD

The present disclosure relates to a safety detecting device and a safety detecting system including the same.

BACKGROUND

The statements in this section merely provide background information related to the present disclosure and may not constitute prior art.

In recent years, various tasks have been performed by using robots. The robots include charging robots that may charge batteries of electric vehicles. A charging robot may be provided with a robot arm having a charging port at an end thereof, and the robot arm may be moved such that the charging port is connected to an electric vehicle.

While the robot arm is moved, an external object (for example, a human being) located around the robot may collide with the robot arm. Thus, it may be desired to provide a safety detecting device that may promote a safety of a human being by preventing a collision between the human being and the robot arm.

For example, a conventional safety detecting device stops an operation of a robot even whenever an external object is detected in an area (e.g., a detection area) where there is no possibility of collision with the robot. Because the operation of the robot is stopped even when the external object is located in such an area where there is no possibility of collision with the robot, an efficiency of tasks performed by the robot deteriorates due to the unnecessary stop of the operation of the robot.

SUMMARY

The present disclosure has been made to solve the above-mentioned problems occurring in the prior art while advantages achieved by the prior art are maintained intact.

An aspect of the present disclosure provides a safety detecting device that may determine an optimum detection area based on a state of a robot to prevent a movement operation of the robot from being unnecessarily stopped.

The technical problems to be solved by the present disclosure are not limited to the aforementioned problems, and any other technical problems not mentioned herein should be clearly understood from the following description by those having ordinary skill in the art to which the present disclosure pertains.

According to an aspect of the present disclosure, a safety detecting device includes a detector that detects an external object located in a detection area, and a controller that determines the detection area based on whether a communication with a robot that is moved in a specific movement area is made. In particular, the controller is configured to determine the detection area as a preset initial detection area in a non-communication state, in which no communication with the robot is made. The controller is further configured to determine the detection area based on any one of posture information of the robot, operation information of the robot, or a combination thereof, in a communication state, in which a communication with the robot is made.

Furthermore, when the controller is in the communication state, the controller may determine a danger detection area in the detection area based on the posture information of the robot. When two reference planes that cross each other are defined as an X plane and a Y plane, the danger detection area may include a first danger detection area located between the X-plane and a first side of the robot, which is close to the X plane, and a second danger detection area located between the Y plane and a second side of the robot, which is close to the Y plane.

Furthermore, when a direction that faces the robot from the X plane is defined as a +Y direction, a direction that faces the robot from the Y plane is defined as a +X direction, and a reference plane that defines a side of the first danger detection area in the +Y direction is defined as an X1 plane, a first angle that may be an angle defined by the X plane and the X1 plane with respect to a current posture of the robot is calculated by Equation 1 as follows:

$$A1 = \tan^{-1} \frac{y_{min} + y_{offset}}{x_{max} + x_{offset}} \quad \text{[Equation 1]}$$

where: A1 is a first angle, $y_{min}$ is a spacing distance between an end of the robot in a $-Y$ direction and the X plane, $y_{offset}$ is a first Y deviation correcting value, $x_{max}$ is a spacing distance between an end of the robot in the +X direction and the Y plane, and $x_{offset}$ is a first X deviation correcting value.

Furthermore, the robot may be configured to charge a vehicle, and when the vehicle that is a charging target is disposed on a side of the safety detecting device in the +X direction, a spacing distance between the Y plane and the vehicle may be larger than a sum of the spacing distance between the end of the robot in the +X direction and the Y plane and the first X deviation correcting value.

Furthermore, the X1 plane may extend from the detector by a first length in the +X direction to be inclined by the first angle with respect to the X plane, and the first length may be calculated by Equation 2 as follows with respect to the current posture of the robot:

$$L1 = \sqrt{x_{max}^2 + y_{min}^2} \quad \text{[Equation 2]}$$

where: L1 is the first length, and $y_{min}$ is the spacing distance between the end of the robot in the $-Y$ direction and the X plane.

Furthermore, a direction that faces the robot from the X plane may be defined as a +Y direction, a direction that faces the robot from the Y plane may be defined as a +X direction, and a reference plane that defines a side of the second danger detection area in the +X direction may be defined as a Y1 plane, and a second angle defined by the Y plane and the Y1 plane with respect to the current posture of the robot may be calculated by Equation 3 as follows:

$$A2 = \tan^{-1} \frac{x_R - x_{offsetR}}{y_R + y_{offsetR}} \quad \text{[Equation 3]}$$

where: A2 is the second angle, $x_R$ is a spacing distance between a center of a body of the robot and the Y plane, $x_{offsetR}$ is a second X deviation correcting value, $y_R$ is a spacing distance between the center of the body of the robot and the X plane, and $y_{offsetR}$ is a second Y deviation correcting value.

Furthermore, the Y1 plane may extend from the detector by a second length in the +Y direction to be inclined by the second angle with respect to the Y plane, and he second length may be calculated by Equation 4 as follows with respect to the current posture of the robot:

$$L2 = \sqrt{x_R^2 + y_R^2} \qquad \text{[Equation 4]}$$

where, L2 is the second length.

Furthermore, the controller may be configured to determine the danger detection area based on current posture information of the robot when the controller is in the communication state and the robot is in a non-operation state. The controller is further configured to determine the danger detection area based on operation scheduled posture information that is posture information targeted by the robot when the controller is in the communication state and the robot is scheduled to be operated to be positioned in a targeted posture.

Furthermore, the controller may be configured to stop an operation of the robot when an external object is detected by the detector in the determined danger detection area based on the operation scheduled posture information when the robot is operated.

Furthermore, the controller may be configured to stop charging of the robot when an external object is detected by the detector in the danger detection area based on the current posture information when the robot charges the vehicle.

Furthermore, the danger detection area may overlap a portion of the movement area.

Furthermore, the safety detecting device may further include an output part controlled by the controller to output visual information and auditory information based on whether the controller communicates with the robot and a detection result by the detector.

Furthermore, the detector may include a safety sensor that detects an external object located within a specific distance from the detector, and a rotation module that rotates the safety sensor about a rotation axis extending in an upward/downward direction, and when a direction, in which the rotation module rotates the safety sensor, is defined as a rotational direction, and when an angle defined by one side and an opposite side of the detection area in the rotation direction is defined as a threshold angle, the rotation module may rotate the safety sensor in a rotation angle range of the threshold angle or less.

Furthermore, the safety sensor may include at least one of a photo sensor, a LiDAR sensor, an ultrasonic sensor, or an image sensor.

According to another aspect of the present disclosure, a safety detecting system includes a robot that is moved in a specific movement area, and a safety detecting device including a detector that detects an external object located in a detection area. The safety detecting device further includes: a controller that determines the detection d area based on whether a communication with the robot is made. The robot includes a robot body, and a robot arm connected to the robot body to be movable and that determines a posture of the robot. The controller may be configured to determine the detection area based on any one of posture information of the robot, operation information of the robot, or a combination thereof in a communication state, in which a communication with the robot is made.

Furthermore, when the controller is in the communication state, the controller may determine a danger detection area in the detection area based on posture information of the robot, the movement area of the robot is divided by an X plane and a Y plane that are two reference planes that passes through the detector and cross each other. The danger detection area may include a first danger detection area located between a side of the robot, which is close to the X plane, and the X plane, when a direction that faces the robot from the Y plane is defined as a +X direction. The robot may be configured to charge a vehicle, and when the vehicle that is a charging target is disposed on a side of the robot in the +X direction, a spacing distance between the Y plane and a side of the vehicle in the +X direction may be larger than a spacing distance between a side of the first danger detection area and the Y plane.

BRIEF DESCRIPTION OF THE DRAWINGS

The above and other objects, features and advantages of the present disclosure should be more apparent from the following detailed description taken in conjunction with the accompanying drawings.

Figure 1:
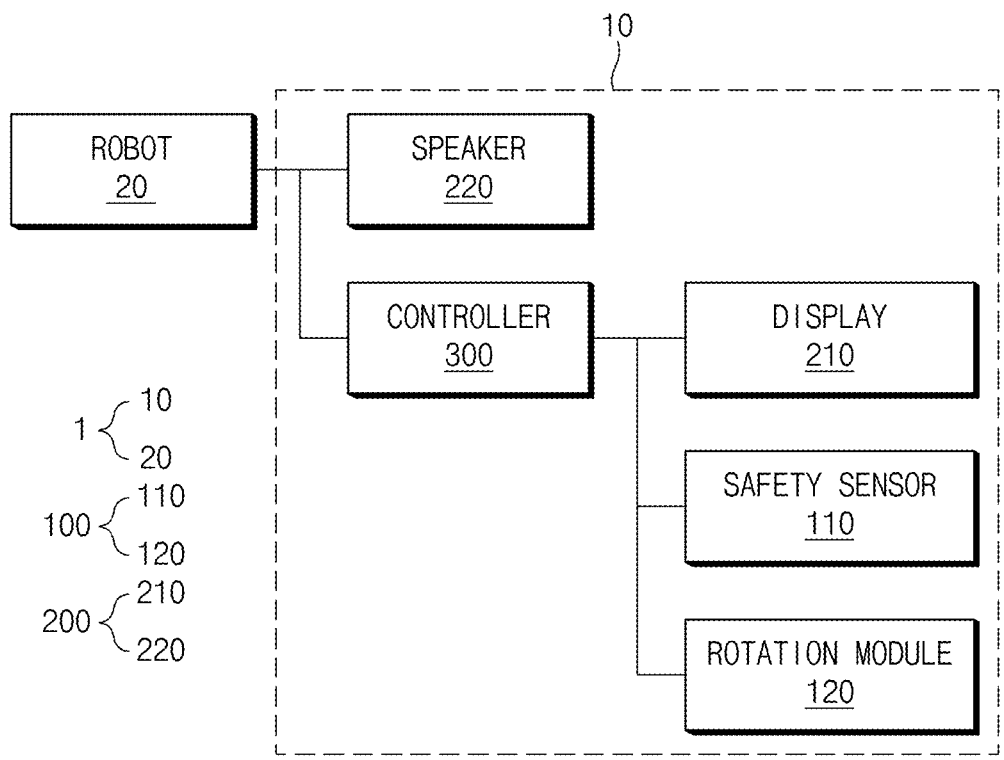
FIG. 1 is a block diagram conceptually illustrating configurations of a safety detecting system according to an embodiment of the present disclosure.

The drawings described herein are for illustration purposes only and are not intended to limit the scope of the present disclosure in any way.

DETAILED DESCRIPTION

Hereinafter, embodiments of the present disclosure are described in detail with reference to the accompanying drawings. In adding reference numerals to the components of the drawings, it is noted that the same components are denoted by the same reference numerals even when they are drawn in different drawings. Furthermore, in describing the embodiments of the present disclosure, when it is determined that a detailed description of related known configurations and functions may hinder understanding of the embodiments of the present disclosure, a detailed description thereof has been omitted.

Furthermore, in describing the components of the embodiments of the present disclosure, terms, such as first, second, "A", "B", (a), and (b) may be used. The terms are simply for distinguishing the components, and the essence, the sequence, and the order of the corresponding components are not limited by the terms. When it is described that a component is "connected to", "fastened to", or "inserted into" another component, it should be understood that the former component may be directly connected to, fastened to, or inserted into the latter component, but a third component may be "connected", "fastened", or "inserted" between the components.

When a component, device, element, or the like of the present disclosure is described as having a purpose or performing an operation, function, or the like, the component, device, or element should be considered herein as being "configured to" meet that purpose or to perform that operation or function.

Hereinafter, a safety detecting system 1 according to an embodiment of the present disclosure is described with reference to the drawings.

Figure 2:
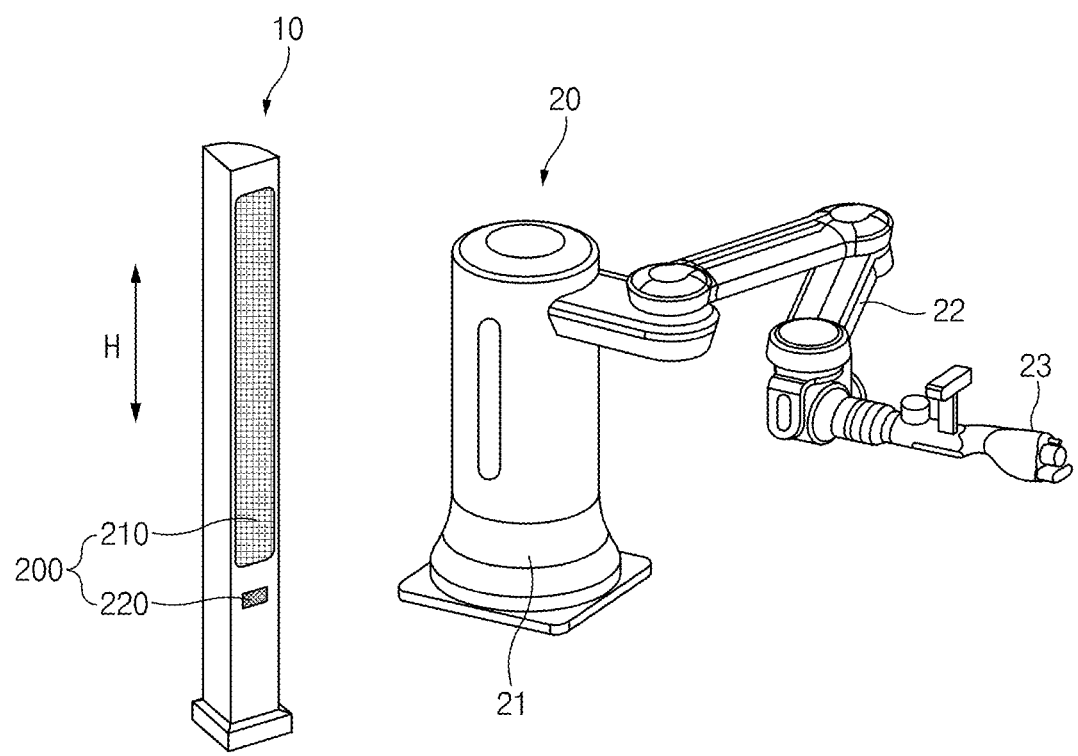
FIG. 2 is a perspective view of a safety detecting device and a robot according to an embodiment of the present disclosure.

Referring to FIGS. 1 and 2, the safety detecting system 1 may include a safety detecting device 10 and a robot 20. The safety detecting device 10 may prevent an external object 2 and the robot 20 from colliding with each other. The external object 2, as an example, may include various objects, such as a human being, an animal, and the like. For example, the safety detecting device 10 may promote a safety of a person by preventing a pedestrian from colliding with the robot 20.

The safety detecting device 10 may communicate with the robot 20. For example, the safety detecting device 10 may communicate with the robot 20 wirelessly (as an example, a Wi-Fi connection or a Bluetooth connection) or by wire. The safety detecting device 10 may include a detector 100, an output part 200, and a controller 300.

The detector 100 may detect an external object located in a detection area. The detection area may mean a space, in which the external object is located. The detector 100, as an example, may be fixedly disposed on a ground surface located in a charging station, in which a battery of a vehicle may be charged. The detector 100 may include a safety sensor 110 and a rotation module 120.

The safety sensor 110 may detect the external object. For example, the safety sensor 110 may detect the external object located within a specific distance from the detector 100. In a more detailed example, the safety sensor 110 may detect the external object located within a specific distance from the detector 100 with respect to a horizontal direction.

The safety sensor 110 may include a light emitting part and a light receiving part. The light emitting part may output light in a direction that becomes farther away from the safety sensor 110. Furthermore, when the light output from the light emitting part is reflected after reaching the external object, the reflected light may be input to the light receiving part. The safety sensor 110 may generate a light emission signal when the light is output from the light emitting part, and may generate a light reception signal when the light is input to the light receiving part. The light emission signal and the light reception signal may be input to the controller 300.

The safety sensor 110 may include at least one of a photo sensor, a Lidar sensor, an ultrasonic sensor, an image sensor, or any combination thereof. The photo sensor may be of a type, in which the light receiving part and the light emitting part are integrally formed. The photo sensor may include a light emitting part that outputs light having a specific frequency, and a light receiving part, to which the light that is output from the light emitting part and then is reflected by the external object is input. The photo sensor may recognize the external object through the light output from the light emitting part and the light input to the light receiving part. Furthermore, the photo sensor may adjust an intensity of the light output from the light emitting part, and a detection distance of the photo sensor may be adjusted by adjusting the intensity of the light.

Furthermore, the light detection and ranging (LiDAR) sensor may include a light emitting part that outputs light having a specific frequency, and a light receiving part, to which the light that is output from the light emitting part and then is reflected is input. The LiDAR sensor, as an example, may recognize an object by using a time of flight (ToF) function. The LiDAR sensor using the ToF function may emit a laser beam that is continuously modulated while having a specific frequency, and may measure a relative distance from the external object based on a change degree of a phase of the laser signal that is obtained when the emitted beam is reflected by the external object. The LiDAR sensor may recognize the external object located in the detection area by repeating the ToF function several times per unit time.

A plurality of safety sensors 110 may be provided. The plurality of safety sensors 110, as an example, may be arranged along the upward/downward direction "H" of the safety detecting device 10. Moreover, the plurality of safety sensors 110 may be arranged along the upward/downward direction "H", and a horizontal direction that is perpendicular to the upward/downward direction "H". The plurality of safety sensors 110 may include a first safety sensor, a second safety sensor, and a third safety sensor.

The rotation module 120 may rotate the safety sensor 110 about a rotation axis that extends in the upward/downward direction "H". The rotation module 120 may rotate the safety sensor 110 within a detection rotation angle of a threshold angle or less. The threshold angle may be defined as an angle defined by one side and an opposite side of the detection area in a rotational direction. The rotational direction may be defined as a direction, in which the rotation module 120 rotates the safety sensor 110.

The rotation module 120, as an example, may be a servo motor that may be driven by a signal that is received from the controller 300. The rotation module 120 may be controlled by the controller 300.

Furthermore, the rotation module 120 may independently rotate the plurality of safety sensors 110. For example, the controller 300 may control the rotation module 120 such that the plurality of safety sensors 110 are rotated within the detection rotation angle that is the threshold angle or less, respectively. The rotation module 120 may be controlled by the controller 300 such that the first safety sensor is rotated within a first detection rotation angle of a first threshold angle or less, a second safety sensor is rotated within a second detection rotation angle of a second threshold angle or less, and a third safety sensor is rotated within a third detection rotation angle of a third threshold angle or less.

The detection area may be determined according to the detection distance and the detection rotation angle. For example, when the detector 100 is viewed in the upward/downward direction "H", the detection area may have a fan shape, a radius of which is the detection distance and a central angle of which is the detection rotation angle.

The output part 200 may output visual information and audible information to an outside based on a state of the safety detecting system 1. The output part 200 may be controlled by one or more of the robot 20 and the controller 300. For example, the output part 200 may be controlled by the controller 300 in a non-communication state, in which the robot 20 and the controller 300 do not communicate with each other, and may be controlled by the robot 20 and the controller 300 in a communication state, in which the robot 20 and the controller 300 communicate with each other. The output part 200 may include a display 210 and a speaker 220.

The display 210 may output visual information to an outside. The display 210 may display an image and a text. For example, the display 210 may output visual information indicating a safety state, a non-safety state, and a danger state to an outside. For example, the display 210 may display a first color when the safety state is output to an outside, may display a second color when the non-safety state is output to an outside, and may display a third color when the danger state is output to an outside. For example, the first color may be a green color, the second color may be a yellow color, and the third color may be a red color.

Furthermore, the display 210 may display various texts according to whether the vehicle is charged. For example, the display 210 may display a text that notifies that the vehicle is being charged when the vehicle is charged. Furthermore, the display 210 may display convenience information, such as a temperature, a weather, or a time, or a greeting message when the vehicle is not charged. The display 210, as an example, may be various means, such as an LCD or an LED, which may display visual information.

The various visual information may be input to the controller 300 in advance. Furthermore, when the robot 20 and the controller 300 are in the non-communication state, the display 210 may be controlled by the controller 300 such that the visual information that is input to the controller 300 in advance is output to an outside.

The speaker 220 may output audible information to an outside. The audible information, as an example, may include audible information that indicates a safety state, a non-safety state, and a danger state, and convenience information, such as whether the vehicle is charged, a temperature, a weather, and a time. The speaker 220, as an example, may be a speaker provided with an audio amplifier.

Furthermore, the speaker 220 may be connected to the robot 20 by wire or wirelessly. Furthermore, when the robot 20 and the controller 300 are in the non-communication state, the speaker 220 may be controlled by the controller 300 such that sound data stored in the audio amplifier are output to an outside.

The controller 300 may determine the detection area based on whether a communication with the robot 20 is made. The controller 300 may determine the detection area as a preset initial detection area in the non-communication state.

Figure 3:
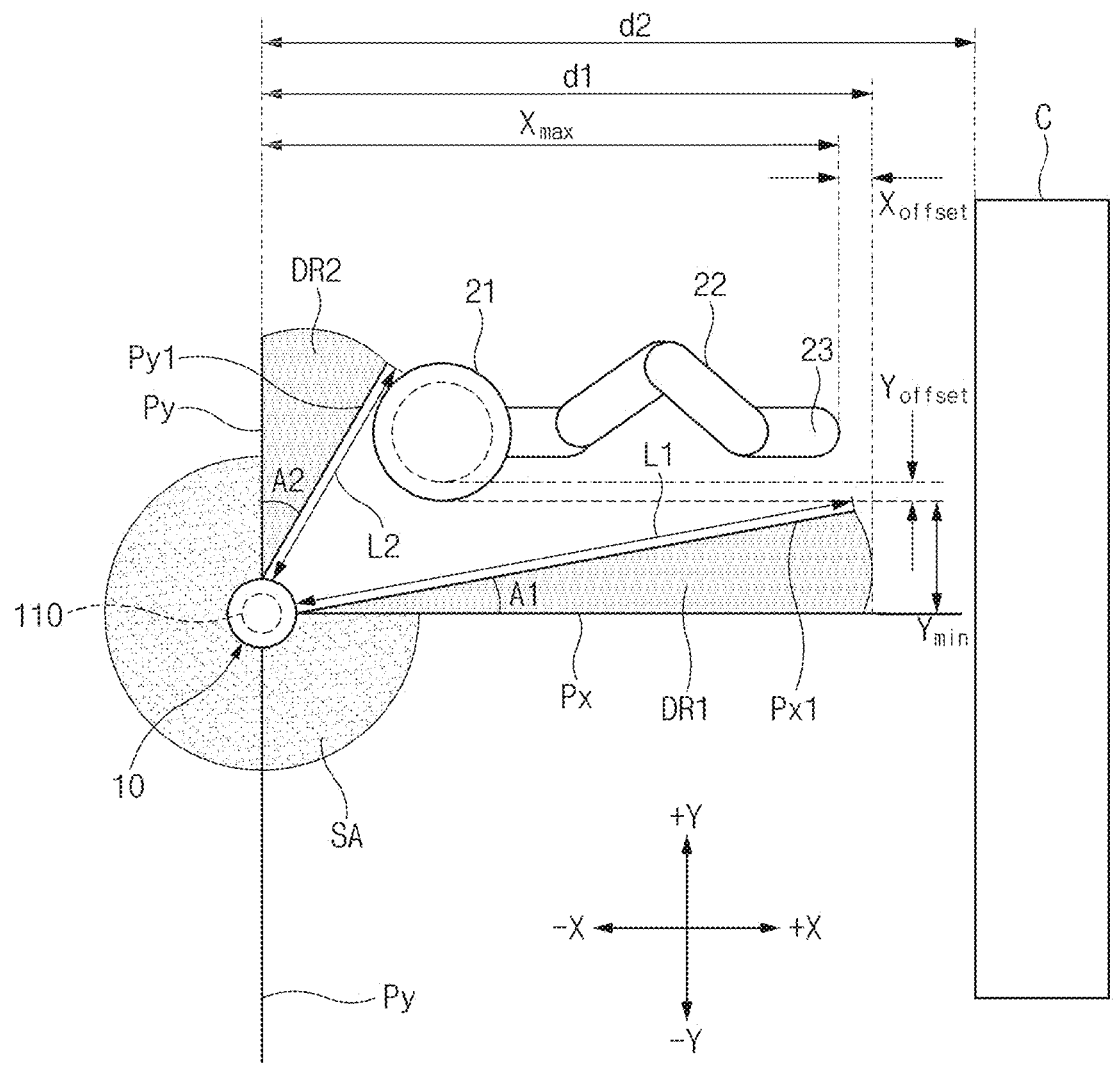
FIG. 3 is a view illustrating a danger detection area and a safety detection area according to an embodiment of the present disclosure.
Figure 4:
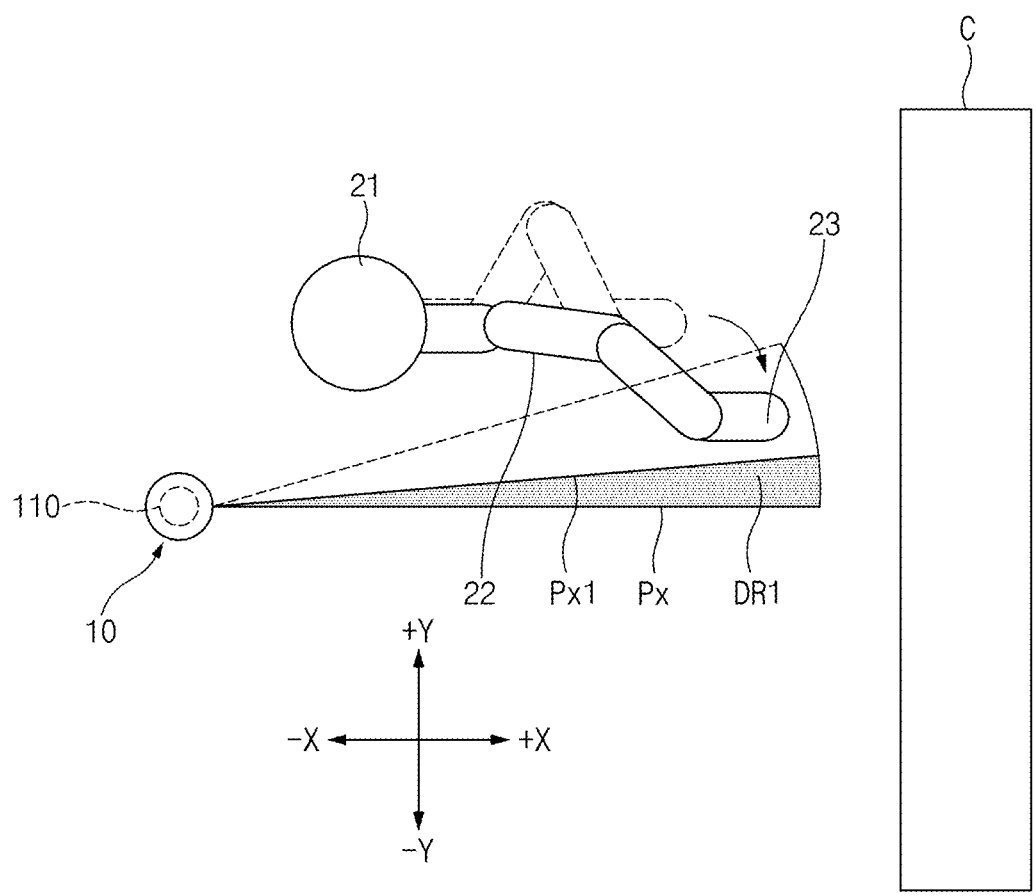
FIG. 4 is a view illustrating a state, in which the danger detection area of FIG. 3 is changed as a robot is moved.

Referring further to FIGS. 3 and 4, the initial detection area may be divided by a X plane "Px" and a Y plane "Py". The X plane Px may be defined as a reference plane that is perpendicular to a first direction +Y. The X plane Px may be defined as a direction that is perpendicular to the upward/downward direction "H". Furthermore, the Y plane Py may be defined as a reference plane that is perpendicular to a second direction +X. The second direction +X may be defined as a direction that is perpendicular to the upward/downward direction and is not parallel to the first direction +Y. For example, the first direction +Y and the second direction +X may be perpendicular to each other. In a more detailed example, the first direction +Y may be a direction that is parallel to a forward/rearward direction, and the second direction +X may be a direction that is parallel to a leftward/rightward direction.

The X plane Px and the Y plane Py may cross each other in the detector 100. In other words, a reference line, at which the X plane Px and the Y plane Py may be parallel to the upward/downward direction "H", and may pass through the detector 100. The initial detection area may have a fan shape, of which a central angle is 90 degrees when the safety detecting system 1 is viewed in the upward/downward direction.

Figure 5:
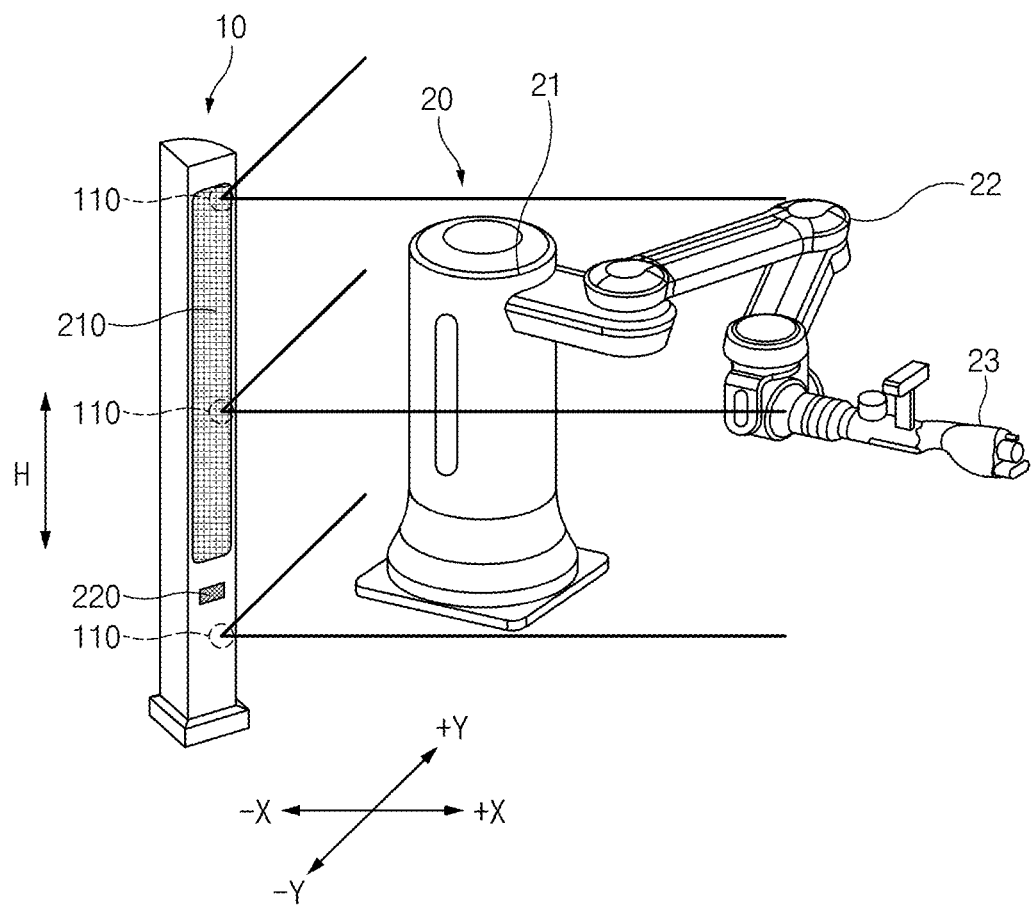
FIG. 5 is a view illustrating a safety detecting system positioned in a first state according to an embodiment of the present disclosure.

Referring to FIG. 5, the controller 300 may control the output part 200 such that visual information and audible information indicating a safety state is output to an outside when the safety detecting system 1 is in a first state. The first state may be defined as a state, in which the robot 20 and the controller 300 are positioned in the non-communication state and the external object 2 is not located in the initial detection area.

Figure 6:
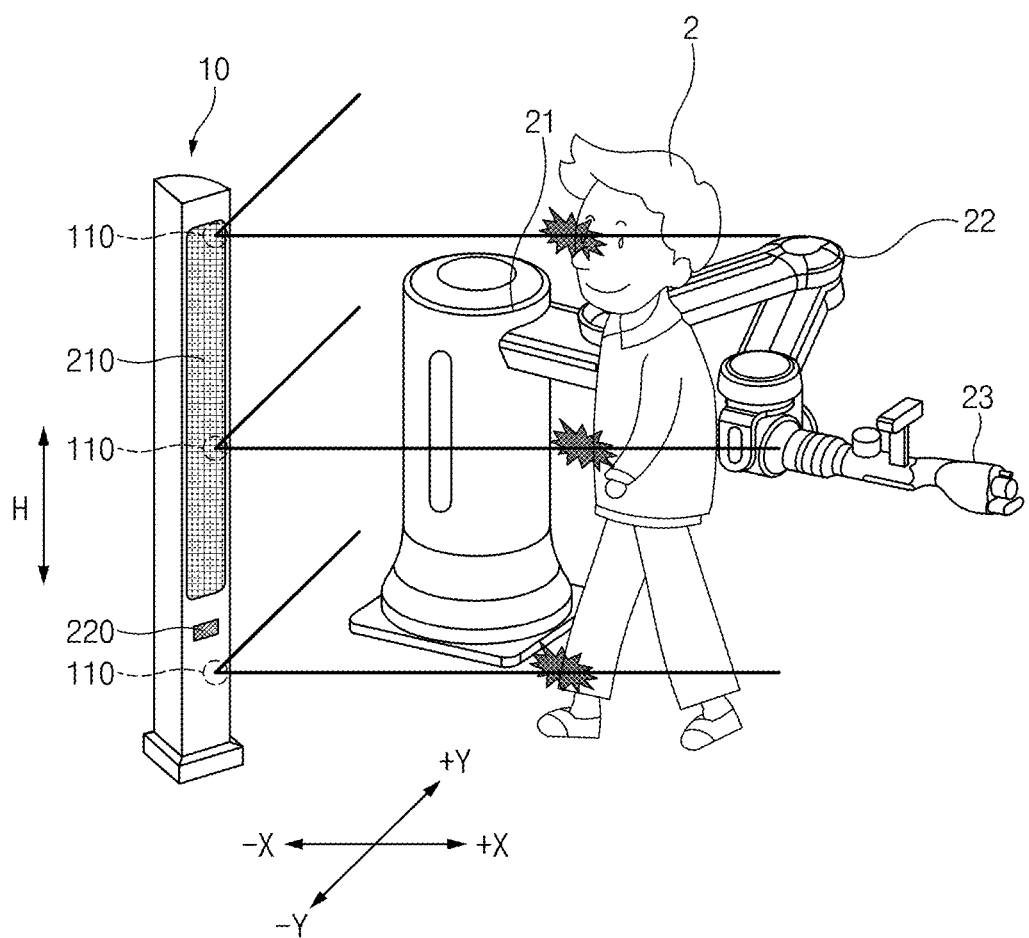
FIG. 6 is a view illustrating a safety detecting system positioned in a second state according to an embodiment of the present disclosure.

Referring further to FIG. 6, the controller 300 may control the output part 200 such that visual information and audible information indicating a danger state is output to an outside when the safety detecting system 1 is in a second state. The second state may be defined as a state, in which the robot 20 and the controller 300 are positioned in the non-communication state and the external object 2 is located in the initial detection area.

Referring back to FIG. 3, the controller 300 may determine the detection area based on any one of posture information or operation information of the robot 20, or a combination thereof in the communication state. The controller 300 may determine danger detection areas DR1 and DR2 in the detection area based on the posture information of the robot 20 in the communication state. For example, the controller 300 may determine the danger detection areas DR1 and DR2 based on current posture information of the robot 20 when the controller 300 is in the communication state and the robot 20 is in a non-operation state. The danger detection areas DR1 and DR2 may include the first danger detection area DR1 and the second danger detection area DR2.

Hereinafter, the danger detection areas DR1 and DR2 determined based on the current posture information of the robot 20 are further described.

The first danger detection area DR1 may be located between a side of the robot 20 in the X plane "Px", and the X plane "Px". For example, the first danger detection area DR1 may be located between a first plane that passes through an end (an end of the robot 20 in the −Y direction) of the robot 20 in the X plane Px and is a reference plane that is parallel to the X plane Px, and the X plane Px. In a more detailed example, the first danger detection area DR1 may be disposed between the first plane and the +X plane. The +X plane may be defined as a reference plane that is located on a side of the detector 100 in the +X direction.

The first danger detection area DR1 may be divided by an X1 plane Px1 and the X plane Px. In other words, the X1 plane "Px1" may be a reference plane that defines a side of the first danger detection area DR1 in the +Y direction, and the X plane Px may define a side of the first danger detection area DR1 in the −Y direction. When the X1 plane is viewed in the upward/downward direction, the X1 plane may have a reference line form that extends by a first length L1. A reference plane may be defined as a set of reference lines that extend by a specific length.

Furthermore, when the safety detecting system 1 is viewed in the upward/downward direction, the first danger detection area DR1 may have a fan shape, a central angle of which is a first angle A1 and a radius of which is the first length L1. The first angle A1 may be defined as an angle defined by the X plane Px and the X1 plane Px1. The first angle A1 may be the above-described first detection rotation angle. The first angle A1 may be calculated by Equation 1.

$$A1 = \tan^{-1} \frac{y_{min} + y_{offset}}{x_{max} + x_{offset}} \quad \text{[Equation 1]}$$

where: A1 is a first angle, $y_{min}$ is a spacing distance between an end of the robot in a −Y direction and the X plane, $y_{offset}$ is a first Y deviation correcting value, $x_{max}$ is a spacing distance between an end of the robot in the +X direction and the Y plane, and $x_{offset}$ is a first X deviation correcting value.

The first Y deviation correcting value, as an example, may be not less than 0.05 times and no more than 0.1 times of $y_{min}$. However, the present disclosure is not limited to the example, and the first Y deviation correcting value may be variously determined according to the kinds of a robot body 21.

Furthermore, the first X deviation correcting value, as an example, may be not more than 0.05 and not less than 0.1 times of $x_{max}$. However, the present disclosure is not limited to the example, and the first X deviation correcting value may be variously determined according to the kinds of a robot arm 22.

Furthermore, when a vehicle "C" that is a charging target is disposed on a side of the safety detecting device 10 in the +X direction, a first spacing distance d1 may be smaller than a second spacing distance d2. The first spacing distance d1 may be defined as a spacing distance between an end of the first danger detection area DR1 in the +X direction, and the Y plane Py. The first spacing distance d1 may be defined as a sum of a spacing distance between an end (as an example, a charging port 23 that is described below) of the robot 20 in the +X direction, and the Y plane Py, and the first X deviation correcting value. The second spacing distance d2 may be defined as a spacing distance between the Y plane Py and the vehicle "C".

The first length L1 may be a detection distance of the first danger detection area DR1. The first length L1 may be calculated by Equation 2.

$$L1 = \sqrt{x_{max}^2 + y_{min}^2} \quad \text{[Equation 2]}$$

where: L1 is the first length, and $y_{min}$ is the spacing distance between the end of the robot in the −Y direction and the X plane.

The controller 300 may control the rotation module 120 such that the first safety sensor is rotated based on the first angle A1 in the communication state. Furthermore, the controller 300 may determine that the external object 2 is detected when the first safety sensor detects the external object 2 located in an area that is spaced apart from the detector 100 by the first length L1 in the communication state.

Furthermore, the controller 300 may determine that the external object 2 is not detected when the first safety sensor detects the external object 2 that is located in an area that is farther from the detector 100 by the first length L1 in the communication state.

The second danger detection area DR2 may be located between a side of the robot 20 in the Y plane Py, and the Y plane Py. For example, the second danger detection area DR2 may be located between a second plane that is a reference plane that passes through an end (as an example, an end of the robot 20 in the −X direction) of the robot 20 in the Y plane "Py" and is parallel to the Y plane Py, and the Y plane Py. In a more detailed example, the second danger detection area DR2 may be disposed between the second plane and the +Y plane. The +Y plane may be defined as a reference plane that is located on a side of the detector 100 in the +Y direction, in the Y plane Py.

The second danger detection area DR2 may be divided by a Y1 plane Py1 and the Y plane Py. In other words, the Y1 plane Py1 may be a reference plane that defines a side of the second danger detection area DR2 in the +X direction, and the Y plane Py may define a side of the second danger detection area DR2 in the −X direction. When the Y1 plane Py1 is viewed in the upward/downward direction, the Y1 plane Py1 may have a reference line form that extends by a second length L2. Furthermore, the robot 20 may be disposed between the X1 plane Px1 and the Y1 plane Py1. For example, the robot 20 may be disposed to be spaced apart from the X1 plane Px1 and the Y1 plane Py1.

Furthermore, when the safety detecting system 1 is viewed in the upward/downward direction, the second danger detection area DR2 may have a fan shape, a central angle of which is the second angle A2 and a radius of which is the second length L2. The second angle A2 may be defined as an angle defined by the Y plane Py and the Y1 plane Py1. The second angle A2 may be the above-described second detection rotation angle. The second angle A2 may be calculated by Equation 3.

$$A2 = \tan^{-1} \frac{x_R - x_{offsetR}}{y_R + y_{offsetR}} \quad \text{[Equation 3]}$$

where: A2 is the second angle, $x_R$ is a spacing distance between a center of a body of the robot and the Y plane, $x_{offsetR}$ is a second X deviation correcting value, $y_R$ is a spacing distance between the center of the body of the robot and the X plane, and $y_{offsetR}$ is a second Y deviation correcting value.

When a radius of the robot body 21 having a cylindrical shape is defined as a robot radius, the second Y deviation correcting value may be determined according to the robot radius. For example, the second Y deviation correcting value may be 1.2 times of the robot radius. However, the present disclosure is not limited to the example, and the second Y deviation correcting value may be variously determined according to the kinds of the robot body 21.

Furthermore, the second X deviation correcting value may be determined according to the robot radius. For example, the second X deviation correcting value may be 1.2 times of the robot radius. However, the present disclosure is not limited to the example, and the second X deviation correcting value may be variously determined according to the kinds of the robot body 21. The second length L2 may be a detection distance of the second danger detection area DR2. The second length L2 may be calculated by Equation 4.

$$L2 = \sqrt{x_R^2 + y_R^2} \qquad \text{[Equation 4]}$$

where L2 is the second length.

The controller 300 may control the rotation module 120 such that the second safety sensor is rotated based on the second angle A2 in the communication state. Furthermore, the controller 300 may determine that the external object 2 is detected, when the second safety sensor detects the external object 2 that is located in an area that is spaced apart from the detector 100 by the second length L2 in the communication state.

Furthermore, the controller 300 may determine that the external object 2 is not detected, when the second safety sensor detects the external object 2 that is located in an area that is more distant from the detector 100 than the second length L2 in the communication state.

Furthermore, the detection area may further include a safety detection area SA when the controller 300 is in the communication state. When four areas divided by the X plane Px and the Y plane Py are a first division area, a second division area, a third division area, and a fourth division area, the danger detection areas DR1 and DR2 may be located in any one of the first to fourth division areas, and the safety detection area SA may be located in the remaining three division areas.

The first division area may be an area divided by the +X plane and the +Y plane, the second division area may be an area divided by the −X plane and the +Y plane, the third division area may be an area divided by the −X plane and the −Y plane, and the fourth division area may be an area divided by the +X plane and the −Y plane.

The safety detection area SA may be located in the second to fourth division areas. The safety detection area SA, as an example, may have a fan shape, a central angle (hereinafter, a safety central angle) is 270 degrees and a radius of which is a safety length that is smaller than the second length L2 when the safety detecting system 1 is viewed in the upward/downward direction. The safety central angle may be the above-described third detection rotation angle.

The controller 300 may control the rotation module 120 such that the third safety sensor is rotated based on the safety central angle in the communication state. Furthermore, the controller 300 may determine that the external object 2 is detected when the third safety sensor detects the external object 2 located in an area that is spaced apart from the detector 100 by the safety length in the communication state.

Furthermore, the controller 300 may determine that the external object 2 is not detected when the third safety sensor detects the external object 2 located in an area that is more distant from the detector 100 than the safety length in the communication state.

Referring back to FIG. 4, the controller 300 may determine the danger detection areas DR1 and DR2 based on operation scheduled posture information that is posture information targeted by the robot 20 when the controller 300 is in the communication state and the robot 20 is operated to be positioned at a targeted posture. The controller 300 may change the determined danger detection areas DR1 and DR2 based on current posture information of the robot 20 when the robot 20 is scheduled to be operated. In other words, when the robot 20 is scheduled to be operated, the controller 300 may newly determine the danger detection areas DR1 and DR2 proactively in correspondence to a scheduled operation of the robot 20.

The controller 300 may change the first danger detection area DR1 based on the scheduled operation of the robot 20 when the robot 20 is scheduled to be operated to be positioned in a targeted posture. For example, the controller 300 may determine the first danger detection area DR1 based on a relative location of an end of the robot 20 in the +X direction to the detector 100 when the end of the robot 20 in the +X direction is scheduled to be moved to a targeted location.

In a more detailed example, the controller 300 may determine the first danger detection area DR1 with reference to when the end of the robot 20 in the +X direction is moved to a targeted location when the end of the robot 20 in the +X direction is scheduled to be moved in a direction that becomes farther from or close to the X plane Px than the current posture of the robot 20. The controller 300 may determine the first danger detection area DR1 such that the robot 20 and the first danger detection area DR1 do not overlap each other. Because the controller 300 may determine the first danger detection area DR1 such that the robot 20 and the first danger detection area DR1 do not overlap each other, the safety detecting system 1 may be prevented from malfunctioning as the detector 100 detects the robot 20.

Furthermore, when the robot 20 is scheduled to be operated so as to be positioned in a targeted posture, the controller 300 may determine the first danger detection area DR1 based on Equation 1 and Equation 2 with reference to when the end of the robot 20 in the +X direction is moved to a targeted location.

Figure 7:
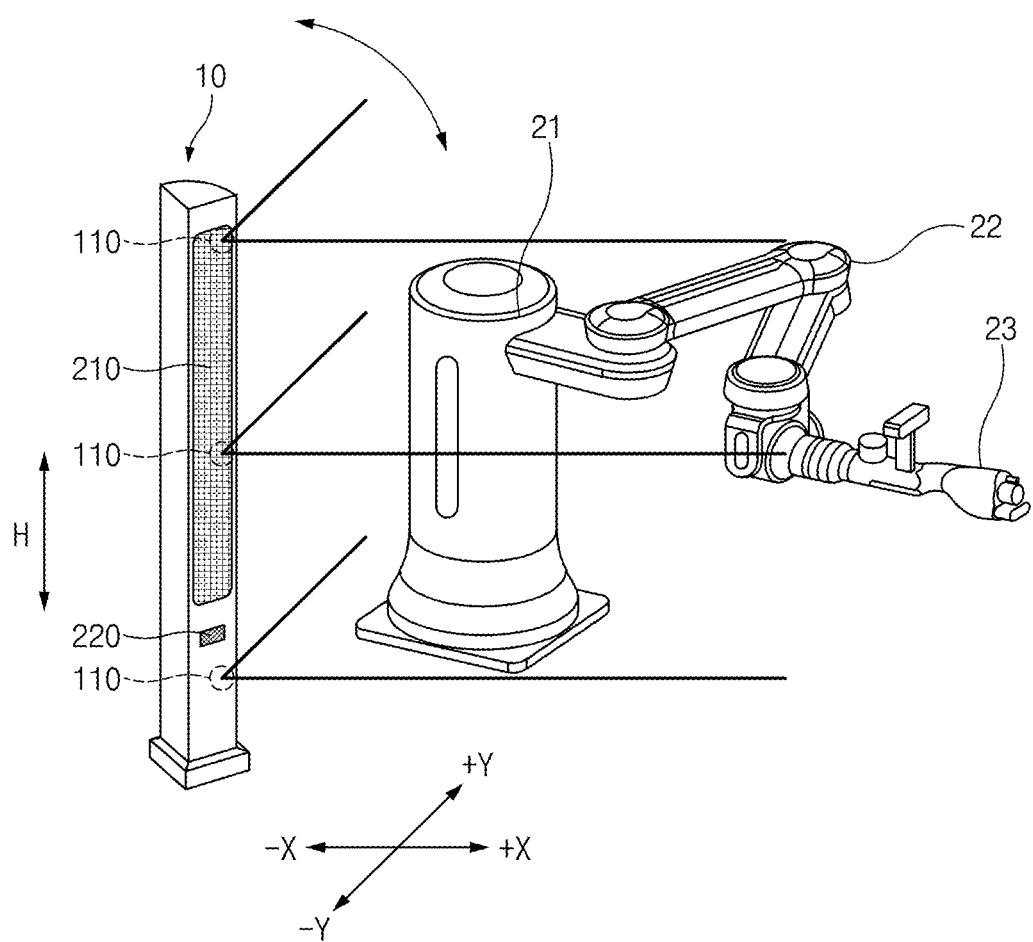
FIG. 7 is a view illustrating a state, in which a robot is stopped in a safety detecting system positioned in a third state, according to an embodiment of the present disclosure.
Figure 8:
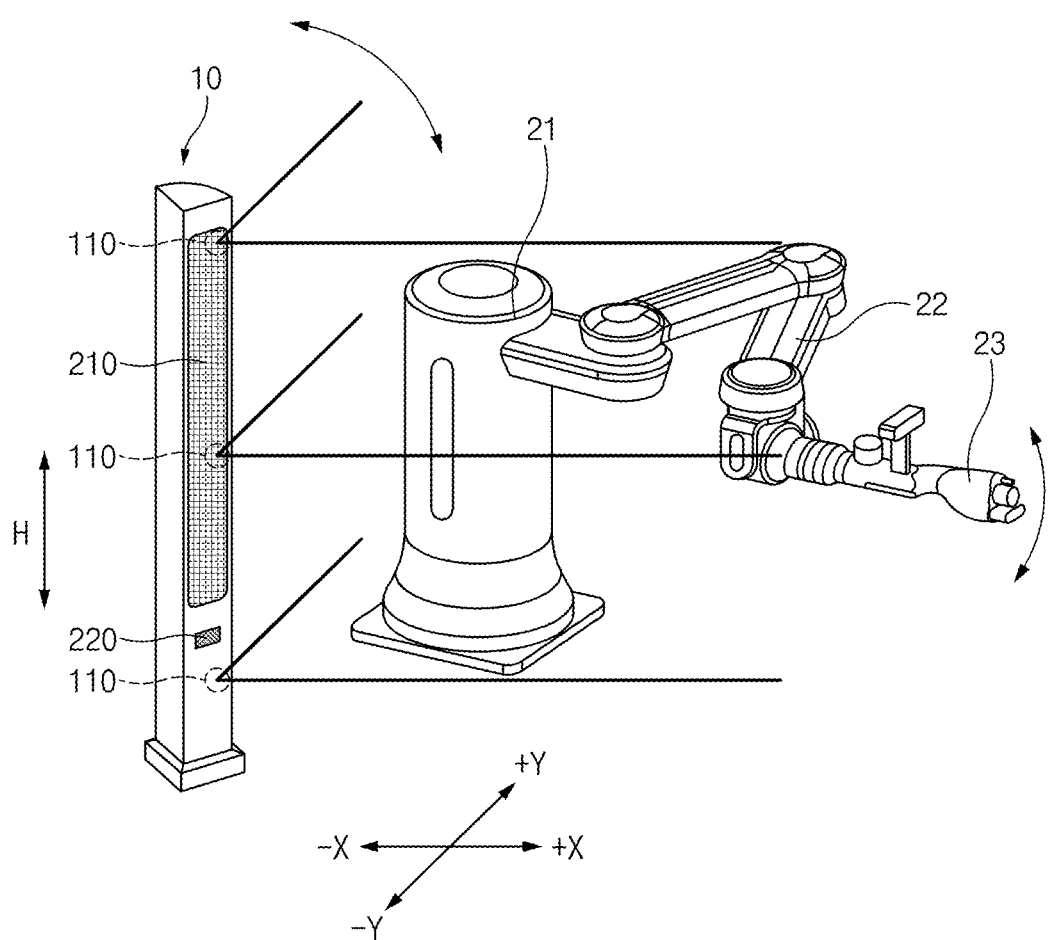
FIG. 8 is a view illustrating a state, in which a robot is moved in a safety detecting system positioned in a third state, according to an embodiment of the present disclosure.

Referring further to FIGS. 7 and 8, the controller 300 may control the output part 200 such that visual information and audible information indicating a safety state are output to an outside when the safety detecting system 1 is in the third state. The third state may be defined as a state, in which the robot 20 and the controller 300 are in the communication state and the external object 2 is not located in the danger detection areas DR1 and DR2 and the safety detection area SA.

Figure 9:
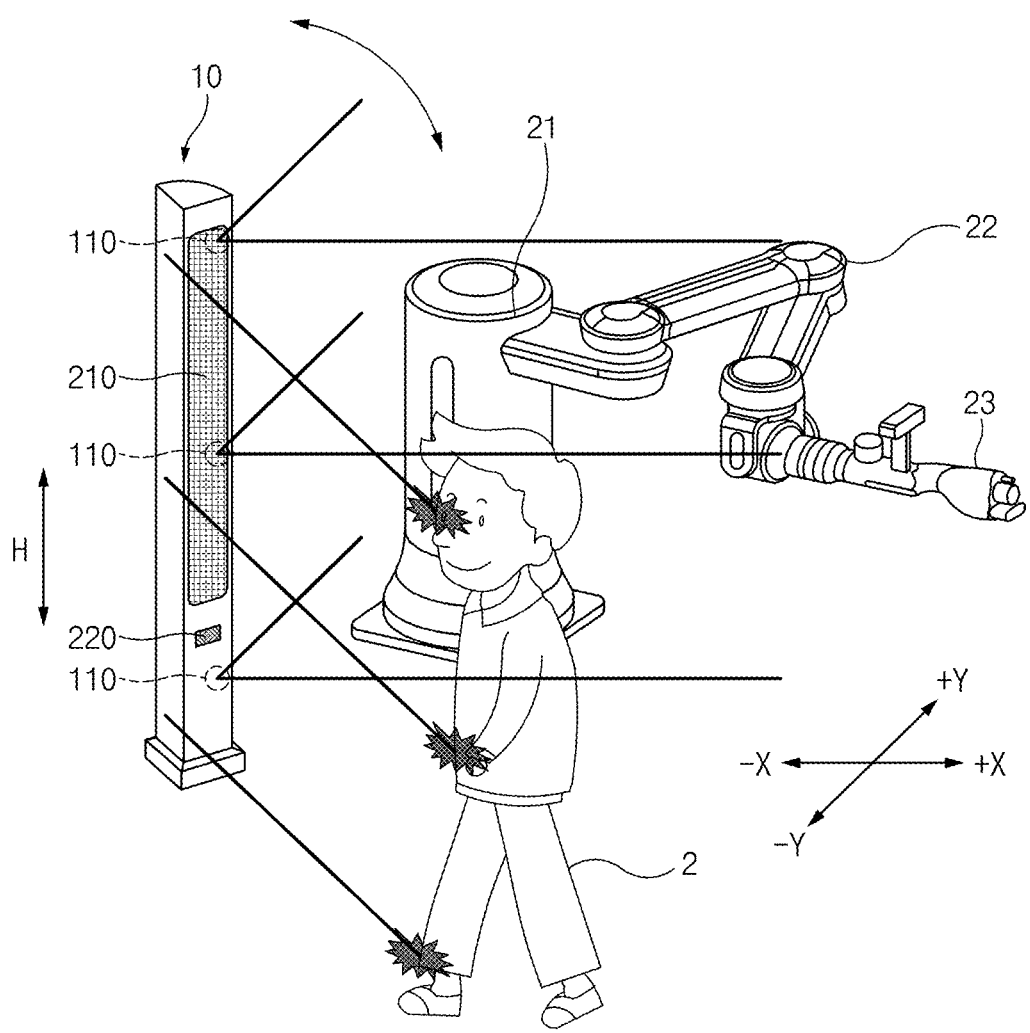
FIG. 9 is a view illustrating a safety detecting system positioned in a fourth state according to an embodiment of the present disclosure.

Referring further to FIG. 9, the controller 300 may control the output part 200 such that visual information and audible information indicating a non-safety state are output to an outside when the safety detecting system 1 is in a fourth state. The fourth state may be defined as a state, in which the robot 20 and the controller 300 are positioned in the communication state and the external object 2 is located in the safety detection area SA.

Furthermore, the controller 300 may control the output part 200 such that a message indicating that the vehicle is being charged to an outside when the safety detecting system 1 is in the fourth state and the robot 20 is charging the vehicle.

Furthermore, the controller 300 may control the output part 200 such that information on a temperature, a weather, and time is output to an outside when the safety detecting system 1 is in the fourth state and the robot 20 is not charging the vehicle.

Figure 10:
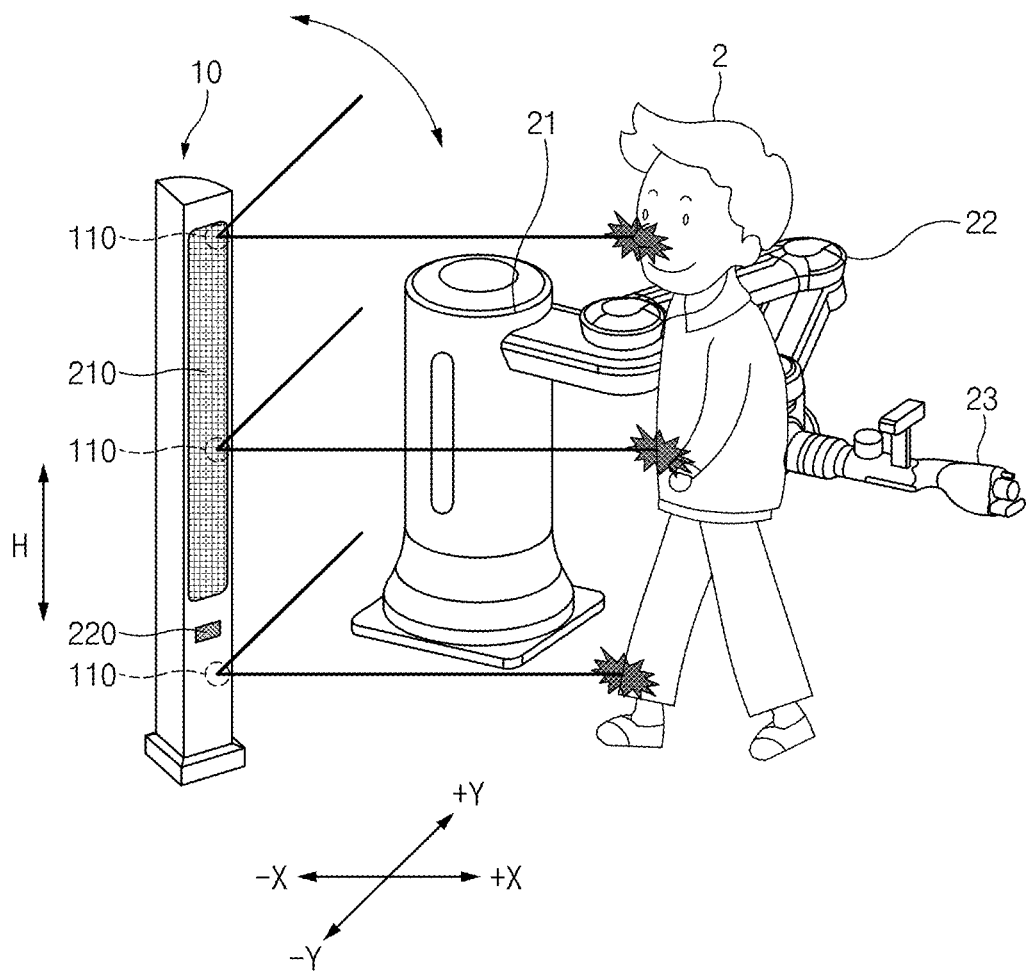
FIG. 10 is a view illustrating a safety detecting system positioned in a fifth state according to an embodiment of the present disclosure.

Referring further to FIG. 10, the controller 300 may control the output part 200 such that visual information and audible information indicating a danger state is output to an outside when the safety detecting system 1 is in a fifth state. The fifth state may be defined as a state, in which the robot 20 and the controller 300 are positioned in the communication state and the external object 2 is located in the danger detection areas DR1 and DR2.

Furthermore, the controller 300 may stop an operation of the robot 20 when the safety detecting system 1 is in the fifth state and the robot 20 is operated.

Furthermore, the controller 300 may stop charging the vehicle by the robot 20 when the safety detecting system 1 is in the fifth state and the robot 20 is charging the vehicle.

The controller 300 may be implemented by a processor that is electrically connected to the robot 20, the detector 100, and the output part 200 and has a function of decoding and executing commands based on information that is input in advance.

The robot 20 may be moved in a specific movement area. The movement area may be located in a first division area. For example, the movement area may be a remaining area of the first division area, except for the second danger detection area DR2. However, the present disclosure is not limited to the example, and the movement area may overlap at least a portion of the second danger detection area DR2 according to a mechanism of the robot 20. Any portion of the movement area may overlap the first danger detection area DR1. The robot 20 may include the robot body 21, the robot arm 22, and the charging port 23.

The robot body 21 may support the robot arm 22 and the charging port 23. The robot body 21 may be disposed to be spaced apart from the detector 100 in a horizontal direction. Furthermore, a relative location of the robot body 21 to the detector 100 may be fixed. The robot body 21 may be fixedly disposed on a ground surface that is located in a charging station.

The robot arm 22 may be connected to the robot body 21 to be rotatable. The robot arm 22 may be rotated about a rotation axis that passes through the robot body 21 and extends in the upward/downward direction "H". Furthermore, the robot arm 22 may include a plurality of links. The plurality of links may be configured to be rotated with respect to each other. One end of the robot arm 22 may be connected to the robot body 21.

The charging port 23 may be fastened to the vehicle "C" to charge the battery of the vehicle "C". The charging port 23 may be connected to an opposite end of the robot arm 22. The charging port 23 may be moved along a horizontal direction through rotation of the plurality of links of the robot arm 22.

Figure 11:
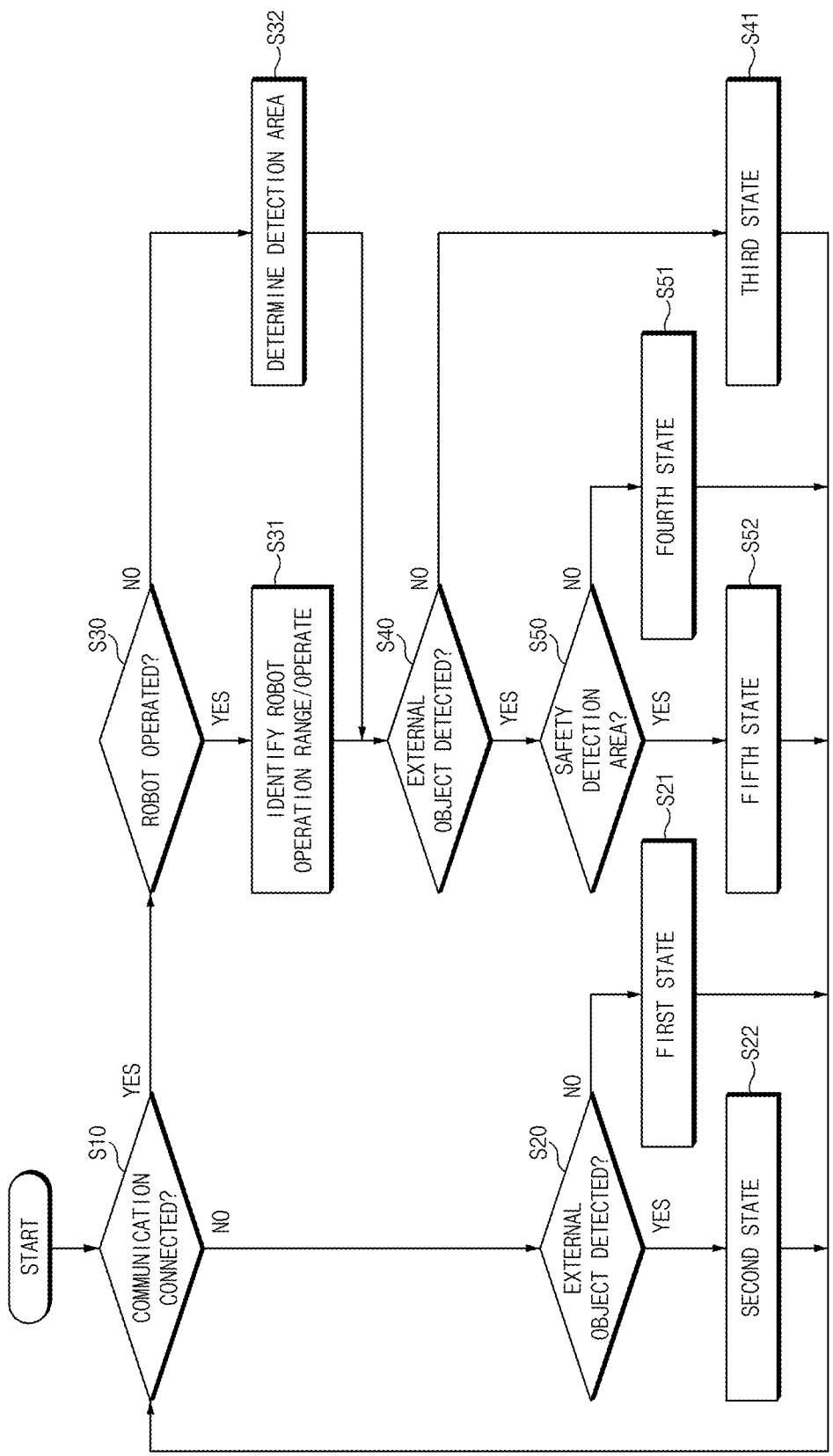
FIG. 11 is a flowchart illustrating a method for controlling a safety detecting system according to an embodiment of the present disclosure.

Hereinafter, referring to FIG. 11, a process of positioning the safety detecting system 1 in the first to fifth states is described.

The controller 300 may determine whether the safety detecting device 10 and the robot 20 are in the communication state (S10).

The controller 300 may determine whether the external object 2 is located in the initial detection area when the safety detecting device 10 and the robot 20 are in the non-communication state (S20).

When the controller 300 determines that the external object 2 is not located in the initial detection area, the safety detecting system 1 may be positioned in the first state (S21).

When the controller 300 determines that the external object 2 is located in the initial detection area, the safety detecting system 1 may be positioned in the second state (S22).

The controller 300 may determine whether the robot 20 is operated when the safety detecting device 10 and the robot 20 are in the communication state (S30).

When the controller 300 determines that the robot 20 is operated, the controller 300 may determine (identify an operation range of the robot 20) the danger detection areas DR1 and DR2 based on operation scheduled posture information of the robot 20.

When the controller 300 determines that the robot 20 is not operated, the controller 300 may determine the danger detection areas DR1 and DR2 based on current posture information of the robot 20 (S32).

The controller 300 may determine whether the external object 2 is located in the determined detection area (S40).

When the controller 300 determines that the external object 2 is not located in the determined detection area, the safety detecting system 1 may be positioned in the third state (S41).

When the controller 300 determines that the external object 2 is located in the determined detection area, the controller 300 may determine whether the external object 2 is located in the safety detection area SA (S50).

When the controller 300 determines that the external object 2 is located in the danger detection areas DR1 and DR2, the safety detecting system 1 may be positioned in the fourth state (S51).

When the controller 300 determines that the external object 2 is located in the safety detection area SA, the safety detecting system 1 may be positioned in the fifth state (S52).

The safety detecting device according to the present disclosure prevents degradation of an efficiency of tasks performed by a robot by determining an optimum detection area based on a state of the robot to prevent a movement operation of the robot from being unnecessarily stopped.

Even when it has been described above that all the components that constitute the embodiments of the present disclosure are combined into one or are combined to be operated, the present disclosure is not limited to the embodiments. That is, all the components may be selectively combined into one to be operated with a range of the purpose of the present disclosure. Further, because the above-described terms, such as "comprising", "including", or "having" mean that the corresponding components may be included unless particularly described in an opposite way, it should be construed that another component is not excluded but may be further included. Unless defined differently, all the terms including technical or scientific terms have the same meanings as those generally understood by an ordinary person in the art, to which the present disclosure pertains. The generally used terms such as the terms defined in advance should be construed to coincide with the context meanings of the related technologies, and should not be construed as ideal or excessively formal meanings unless defined explicitly in the present disclosure.

The above description is a simple exemplification of the technical spirits of the present disclosure, and the present disclosure may be variously corrected and modified by those having ordinary skill in the art to which the present disclosure pertains without departing from the features of the present disclosure. Accordingly, the embodiments disclosed in the present disclosure are not provided to limit the technical spirits of the present disclosure but provided to describe the present disclosure, and the scope of the technical spirits of the present disclosure is not limited by the embodiments. Accordingly, the technical scope of the present disclosure should be construed by the attached claims, and all the technical spirits within the equivalent ranges fall within the scope of the present disclosure.

What is claimed is:

1. A safety detecting device comprising:
   a detector configured to detect an external object located in a detection area; and a controller configured to determine the detection area based on whether a communication with a robot configured to be moved in a movement area is made,
wherein the controller is configured to:
  determine the detection area as a preset initial detection area in a non-communication state, in which no communication with the robot is made; and
  determine the detection area based on at least one of posture information of the robot, or operation information of the robot in a communication state, in which a communication with the robot is made,
wherein the detector includes:
  a safety sensor configured to detect an external object located within a specific distance from the detector; and
  a rotation module configured to rotate the safety sensor about a rotation axis extending in an upward/downward direction of the safety detecting device, and
wherein when a direction, in which the rotation module rotates the safety sensor, is defined as a rotational direction, and
when an angle defined by one side and an opposite side of the detection area in the rotation direction is defined as a threshold angle, the rotation module is configured to rotate the safety sensor in a rotation angle range of the threshold angle or less.

2. The safety detecting device of claim 1, wherein when the controller is in the communication state,
  the controller is configured to determine a danger detection area in the detection area based on the posture information of the robot, and
wherein when two reference planes that cross each other are defined as an X plane and a Y plane,
  the danger detection area includes:
  a first danger detection area located between the X plane and a first side of the robot, which is close to the X plane, and a second danger detection area located between the Y plan and a second side of the robot, which is close to the Y plane.

3. The safety detecting device of claim 2, wherein when a direction that faces the robot from the X plane is defined as a +Y direction, a direction that faces the robot from the Y plane is defined as a +X direction, and a reference plane that defines a side of the first danger detection area in the +Y direction is defined as an X1 plane,
  a first angle that is an angle defined by the X plane and the X1 plane with respect to a current posture of the robot is calculated as:

$$A1 = \tan^{-1} \frac{y_{min} + y_{offset}}{x_{max} + x_{offset}}$$

is a first angle, $y_{min}$ spacing distance between an end of the robot in a −Y direction and the X plane, $y_{offset}$ is a first Y deviation correcting value, x_max distance between an end of the robot in the +X direction and the Y plane, and $x_{offset}$ is a first X deviation correcting value.

4. The safety detecting device of claim 3, wherein the robot is configured to charge a vehicle, and
  wherein when the vehicle that is a charging target is disposed on a side of the safety detecting device in the +X direction,
  a spacing distance between the Y plane and the vehicle is larger than a sum of the spacing distance between the end of the robot in the +X direction and the Y plane and the first X deviation correcting value.

5. The safety detecting device of claim 3, wherein the X1 plane extends from the detector by a first length in the +X direction to be inclined by the first angle with respect to the X plane, and
  wherein the first length with respect to the current posture of the robot is calculated as:

$$L1 = \sqrt{x_{max}^2 + y_{min}^2}$$

is the first length, and $y_{min}$e spacing distance between the end of the robot in the −Y direction and the X plane.

6. The safety detecting device of claim 2, wherein a direction that faces the robot from the X plane is defined as a +Y direction, a direction that faces the robot from the Y plane is defined as a +X direction, and a reference plane that defines a side of the second danger detection area in the +X direction is defined as a Y1 plane,
  a second angle defined by the Y plane and the Y1 plane with respect to a current posture of the robot is calculated as:

$$A2 = \tan^{-1} \frac{x_R - x_{offsetR}}{y_R + y_{offsetR}},$$

where: A2 is the second angle, $x_R$ is a spacing distance between a center of a body of the robot and the Y plane, $x_{offsetR}$ is a second X deviation correcting value, $y_R$ is a spacing distance between the center of the body of the robot and the X plane, and $y_{offsetR}$ is a second Y deviation correcting value.

7. The safety detecting device of claim 6, wherein the Y1 plane extends from the detector by a second length in the +Y direction to be inclined by the second angle with respect to the Y plane, and
  wherein the second length with respect to the current posture of the robot is calculated as:

$$L2 = \sqrt{x_R^2 + y_R^2},$$

where L2 is the second length.

8. The safety detecting device of claim 2, wherein the controller is configured to:
  determine the danger detection area based on current posture information of the robot when the controller is in the communication state and the robot is in a non-operation state; and
  determine the danger detection area based on operation scheduled posture information that is posture information targeted by the robot when the controller is in the communication state and the robot is scheduled to be operated to be positioned in a targeted posture.

9. The safety detecting device of claim 8, wherein the controller is configured to:
  stop an operation of the robot when an external object is detected by the detector in the determined danger detection area based on the operation scheduled posture information when the robot is operated.

10. The safety detecting device of claim 8, wherein the controller is configured to:

stop charging a vehicle by the robot when an external object is detected by the detector in the danger detection area based on the current posture information when the robot charges a vehicle.

11. The safety detecting device of claim 2, wherein the danger detection area is configured to overlap a portion of the movement area of the robot.

12. The safety detecting device of claim 1, further comprising:
an output part controlled by the controller and configured to output visual information and auditory information based on whether the controller communicates with the robot and a detection result by the detector.

13. The safety detecting device of claim 1, wherein the safety sensor includes at least one of a photo sensor, a LiDAR sensor, an ultrasonic sensor, or an image sensor.

14. A safety detecting system comprising:
a robot configured to be moved in a movement area; and
a safety detecting device including a detector configured to detect an external object located in a detection area, and a controller configured to determine the detection area based on whether a communication with the robot is made,
wherein the robot includes:
a robot body, and a robot arm connected to the robot body to be movable and configured to determine a posture of the robot,
wherein the controller is configured to:
determine the detection area based on at least one of posture information of the robot, or operation information of the robot in a communication state, in which a communication with the robot is made,
wherein when the controller is in the communication state, the controller is configured to determine a danger detection area in the detection area based on posture information of the robot,
wherein the movement area of the robot is divided by an X plane and a Y plane that are two reference planes that passes through the detector and cross each other,
wherein the danger detection area includes a first danger detection area located between an end of the robot in the X plane direction and the X plane,
wherein when a direction that faces the robot from the Y plane is defined as a +X direction, the robot is configured to charge a vehicle, and
wherein when a vehicle that is a charging target is disposed in the +X direction of the robot, a spacing distance between the Y plane and a side of the vehicle in the +X direction is larger than a spacing distance between a side of the first danger detection area and the Y plane.

* * * * *